United States Patent [19]

Farzin-Nia

[11] Patent Number: 5,314,109
[45] Date of Patent: May 24, 1994

[54] BRAZING ALLOY AND METHOD OF BRAZING

[75] Inventor: Farrokh Farzin-Nia, Inglewood, Calif.

[73] Assignee: Ormco Corporation, Glendora, Calif.

[21] Appl. No.: 52,716

[22] Filed: Apr. 26, 1993

[51] Int. Cl.$^5$ .......................... C22C 30/02; C22C 5/06
[52] U.S. Cl. .......................... 228/262.42; 228/262.61; 228/262.9; 420/505; 433/207
[58] Field of Search .................. 228/262.31, 262.42, 228/262.61, 262.9, 122; 420/503, 505; 433/207

[56] References Cited

U.S. PATENT DOCUMENTS

| | | | |
|---|---|---|---|
| 1,090,939 | 3/1914 | Newton | 420/507 |
| 1,731,211 | 10/1929 | Davignon | 420/507 |
| 1,882,114 | 10/1932 | Brady | 420/505 |
| 1,987,452 | 1/1935 | Taylor | 420/508 |
| 2,050,077 | 8/1936 | Wise | 420/508 |
| 2,161,574 | 6/1939 | Hensel et al. | 420/505 |
| 2,304,416 | 12/1942 | Leuser | 420/508 |
| 2,319,259 | 5/1943 | Peterson | 420/505 |
| 2,947,623 | 8/1960 | Lincoln | 420/508 |
| 3,151,386 | 10/1964 | Ingersoll | 420/505 |
| 3,340,050 | 9/1967 | Nielsen et al. | 420/508 |
| 3,661,569 | 5/1972 | Abbott | 420/505 |
| 3,663,217 | 5/1972 | Olson et al. | 228/262.42 |
| 3,892,564 | 7/1975 | Hatswell et al. | 420/511 |
| 3,925,066 | 12/1975 | Kohrn et al. | 420/504 |
| 3,925,073 | 12/1975 | Kohrn et al. | 420/504 |
| 3,981,724 | 9/1976 | Prasad | 420/587 |
| 4,007,040 | 2/1977 | Kropp | 420/508 |
| 4,093,455 | 6/1978 | Makino et al. | 148/4 |
| 4,255,191 | 3/1981 | Kropp | 420/587 |
| 4,369,162 | 1/1983 | Wagner et al. | 420/503 |
| 4,411,863 | 10/1983 | Otsuka et al. | 420/580 |
| 4,522,783 | 6/1985 | Menicucci | 420/503 |
| 4,664,629 | 5/1987 | Chodkowski | 420/504 |
| 4,704,089 | 11/1987 | Shoher et al. | 433/183 |
| 5,045,411 | 9/1991 | Taylor et al. | 420/504 |

FOREIGN PATENT DOCUMENTS 210132 12/1983 Japan .................. 420/505

Primary Examiner—Kenneth J. Ramsey
Attorney, Agent, or Firm—Wood, Herron & Evans

[57] ABSTRACT

A method of joining orthodontic appliances or dental appliances by brazing with an alloy material containing at least about 50% by weight silver and at least about 20% by weight gold.

14 Claims, No Drawings

5,314,109

BRAZING ALLOY AND METHOD OF BRAZING

FIELD OF THE INVENTION

This invention relates to brazing alloys, and in particular to brazing alloys used to join orthodontic members or dental members.

BACKGROUND OF THE INVENTION

Various brazing alloys have been used in the orthodontic and dental field to join together a variety of members including orthodontic and dental appliances. It is typically desirable for such alloys to exhibit excellent corrosion resistance and bonding strength especially for orthodontic and dental use. One group of alloys known to be useful to braze together orthodontic appliances have compositions with very high gold contents. One such alloy contains 82% by weight gold and 18% by weight nickel. Satisfactory results are obtained when this specific alloy is used to braze together orthodontic brackets and pads. However, with its high gold content, this alloy and other high gold content alloys are very expensive. In addition, many orthodontic appliances, including brackets and pads, are made of stainless steel. For most of the high gold content brazing alloys used to join such appliances, the brazing joint has a noticeably different color than the stainless steel appliances. Aesthetically, this color difference is not desirable.

Another group of alloys known to be useful to braze together orthodontic appliances have compositions with very high silver content and virtually no gold. Examples of such silver based alloy compositions, by weight percent, are as follows: 72% silver (Ag) and 28% copper (Cu); 54% silver (Ag), 25% palladium (Pd) and 21% copper (Cu); and 54% silver (Ag), 25% palladium (Pd), 2% zinc (Zn), 16% copper (Cu) and 3% antimony (Sb). Because of the low gold content, these alloys are relatively inexpensive. However, these very high silver content brazing alloys tend to tarnish and discolor. This tarnishing also results in an undesirable color difference between the brazing joint and stainless steel orthodontic appliances.

SUMMARY OF THE INVENTION

The present invention is directed to relatively inexpensive brazing alloys for orthodontic and dental applications which exhibit a degree of corrosion resistance and bonding strength sufficient for use as a brazing alloy for joining together at least two members, such as orthodontic or dental appliances, without unsightly tarnishing. The present invention is also directed to a method of joining at least two orthodontic or dental members together with such brazing alloys.

The brazing alloys of the present invention contain at least about 50% by weight silver and at least about 20% by weight gold. In a narrower form, the present brazing alloys have compositions falling within the range of at least about 50 weight percent silver, about 20 to about 40 weight percent gold, and up to about 20 weight percent of at least one element of the group copper, nickel, tin, palladium, platinum, antimony, and zinc or combinations thereof. Examples of specific brazing alloys of this invention include an alloy containing about 70 weight percent silver and about 30 weight percent gold, as well as an alloy containing about 70 weight percent silver, about 28 weight percent gold, and about 2 weight percent nickel. These two specific alloys retain a silver color that is compatible with the color of stainless steel and exhibit other characteristics such as corrosion resistance and bonding strength to a degree suitable for use as brazing materials. It is believed that all of the broad range of brazing alloys of the present invention will also exhibit these same characteristics to a sufficient degree.

In one of its aspects, the present invention provides a method of joining at least two orthodontic appliances by brazing the appliances together with at least one of the above brazing alloys of this invention In another of its aspects, the present invention provides a method of joining at least two dental appliances, also by brazing the appliances together with one of the above brazing alloys of this invention.

The above and other objectives, features and advantages of the present invention will become apparent upon consideration of the following detailed description.

DETAILED DESCRIPTION OF THE INVENTION

The present invention relates to metal alloys having properties which make them suitable for being used as brazing material to join together orthodontic appliances or dental appliances.

A brazing alloy according to a preferred embodiment of the present invention contains about 70% by weight silver (Ag) and about 30% by weight gold (Au). However, it is believed that alloys containing at least about 50% by weight silver and at least about 20% by weight gold will be suitable as brazing materials for joining orthodontic or dental appliances. It is also believed that other elements such as copper (Cu), nickel (Ni), tin (Sn), palladium (Pd), platinum (Pt), antimony (Sb) and zinc (Zn) can be added in substitution for gold, individually or in combination, in amounts up to about 20% by weight with the resulting alloys having suitable properties for use as a brazing material in orthodontic or dental applications. Such elements as Cu, Sb and Zn should be useful in lowering the melting point of the brazing alloy, and such elements as Ni, Pd and Pt should be useful in improving the corrosion resistance and resistance to undesirable tarnishing of the alloy. Such elements as Sn are likely to only help resist undesirable tarnishing. An example of one such brazing alloy which has been used to join an orthodontic bracket and pad with satisfactory results contains about 70% by weight silver, about 28% by weight gold, and about 2% by weight nickel. The nickel improves the wetability and adhesion of the brazing alloy to stainless steels.

The brazing alloys according to the present invention are made using manufacturing techniques well known in the alloying art. Generally, such manufacturing techniques include melting the constituent compositional elements of the alloy together and forming an ingot from the molten alloy.

After being produced, the particular brazing alloy desired can be provided in a variety of forms suitable for brazing purposes. For example, the alloy can be provided in a paste form using atomization processes well known in the industry. With such a process, the alloy ingot is rendered into powder or particle form which is then mixed with a flux to form a paste. The alloy paste can then be applied between the members to be joined. The members are then heated to a temperature sufficient to drive off the flux and melt the alloy particles to form a brazing joint.

The brazing alloy can also be provided in the form of a wire. A wire can be produced by first forming the ingot into a bar shape and then drawing the bar to the final wire size (i.e. diameter) through intermediate heat treatment and drawing steps. Standard drawing and heat treatment techniques, well known in the wire forming industry, may be used. When brazing together a stainless steel orthodontic bracket and pad, the alloy is preferably formed into a fine wire. For most orthodontic brackets and pads, the wire typically has a diameter of less than about 0.100 inches (2.54 mm), and preferably either about 0.010, 0.015 or 0.020 inches (0.254, 0.381 or 0.508 mm), and is cut into specific lengths, generally between about 0.05 inches (1.27 mm) to about 0.125 inches (3.175 mm), depending upon the size of the brazing joint needed for a given bracket and pad. The wire is preferably tack welded between the bracket and pad, producing a bracket assembly. The wire is melted to form the brazing joint by running the bracket assembly through a furnace having a protective atmosphere, preferably a hydrogen atmosphere, at a temperature of approximately 1,000° C. for about 10 to 15 minutes.

The amount (i.e., volume) of the brazing material used should be sufficient to completely fill the space between the bracket and the pad. If an insufficient amount of brazing material is used, a recess can form around the edge of the joint between the bracket and the pad which can collect, for example, food particles, making oral hygiene more difficult. If too much brazing material is used, any excess will likely run out of the joint requiring, for example, costly re-work of the bracket assembly. The wire thicknesses and lengths specified above have been found to not only provide a sufficient amount of brazing material, but also to facilitate manipulation of the wire.

In comparing the properties of an exemplary brazing alloy of the present invention (i.e., 70% by weight silver, 28% by weight gold, and 2% by weight nickel) with a prior brazing alloy having a very high gold content (i.e., 82% by weight gold and 18% by weight nickel), the exemplary alloy has comparable properties as a brazing material along with a number of advantages over the prior higher gold content brazing alloy. For instance, the present alloy is significantly less expensive than the prior alloy, due mainly to the lower gold content. In addition, the present alloy has a silver color which is similar to the color of stainless steel. The prior high gold content alloy has a gold color which is distinctly different than the color of stainless steel.

From the above disclosure of the general principles of the present invention and the preceding detailed description, those skilled in the art will readily comprehend the various modifications to which the present invention is susceptible. Therefore, the scope of the invention should be limited only by the following claims and equivalents thereof.

What is claimed is:

1. A method of joining at least two orthodontic and/or dental members together, comprising the steps of:
   providing a brazing alloy containing at least about 50% by weight silver and at least about 20% by weight gold; and
   brazing said at least two members together with said brazing alloy.

2. The method of claim 1 wherein at least two of said members are orthodontic appliances.

3. The method of claim 1 wherein at least two of said members are dental appliances.

4. The method of claim 1 wherein said brazing alloy contains up to about 20% by weight of at least one element from a group comprising copper, nickel, tin, palladium, platinum, antimony, and zinc or combinations thereof.

5. The method of claim 1 wherein said brazing alloy contains at least about 50% by weight silver, in the range of about 20 to about 40% by weight gold, and up to about 20% by weight of at least one element from a group comprising copper, nickel, tin, palladium, platinum, antimony, and zinc or combinations thereof.

6. The method of claim 1 wherein said brazing alloy contains up to about 20% by weight of at least one element from a group comprising copper, antimony and zinc or combinations thereof.

7. The method of claim 1 wherein said brazing alloy contains up to about 20% by weight of at least one element from a group comprising nickel, palladium, and platinum or combinations thereof.

8. The method of claim 1 wherein said brazing alloy contains about 70% by weight silver and about 30% by weight gold.

9. The method of claim 8 wherein said brazing alloy contains about 70% by weight silver, about 28% by weight gold, and about 2% by weight nickel.

10. The method of claim 1 wherein said brazing alloy is in wire form before being used to braze said at least two members together.

11. The method of claim 10 wherein said wire has a diameter of less than about 0.100 inches (2.54 mm).

12. The method of claim 10 wherein said wire has a diameter in the range of about 0.010 niches (0.254 mm) to about 0.020 inches (0.508 mm).

13. The method of claim 10 wherein said wire has a length within the range of about 0.050 inches (1.27 mm) to about 0.125 inches (3.175 mm).

14. The method of claim 1 wherein said members are brazed together at a temperature of approximately 1,000° C.

* * * * *

UNITED STATES PATENT AND TRADEMARK OFFICE
CERTIFICATE OF CORRECTION

PATENT NO. : 5,314,109
DATED      : May 24, 1994
INVENTOR(S): Farrokh Farzin-Nia It is certified that error appears in the above-indentified patent and that said Letters Patent is hereby corrected as shown below:

At column 4, line 47, please replace "niches" with --inches--.

Signed and Sealed this

Twentieth Day of September, 1994

Attest:

BRUCE LEHMAN

Attesting Officer

Commissioner of Patents and Trademarks